United States Patent [19]

Miyashita et al.

[11] Patent Number: 5,467,326

[45] Date of Patent: Nov. 14, 1995

[54] APPARATUS FOR SELECTIVELY PLAYING A RECORDING MEDIUM

[75] Inventors: Masahiko Miyashita, Tokorozawa; Tatsuyuki Miyazawa; Hiroshi Fujii, both of Tokyo; Yoshihiro Kitano, Tokorozawa, all of Japan

[73] Assignee: Pioneer Electronic Corporation, Tokyo, Japan

[21] Appl. No.: 314,895

[22] Filed: Sep. 29, 1994

[30] Foreign Application Priority Data

Oct. 5, 1993 [JP] Japan .................................. 5-249272

[51] Int. Cl.⁶ .................................................. G11B 17/22
[52] U.S. Cl. .................................................. 369/30; 369/34
[58] Field of Search .................................. 369/30, 33, 34, 369/35, 36, 37, 38, 39, 40, 41, 178, 180, 197; 395/425, 275

[56] References Cited

U.S. PATENT DOCUMENTS

| | | | |
|---|---|---|---|
| 4,740,938 | 4/1988 | Bierhoff et al. | 369/30 |
| 5,051,973 | 9/1991 | Shiba et al. | 369/30 |
| 5,235,572 | 8/1993 | Tamai | 369/30 |
| 5,253,234 | 10/1993 | Ogawa et al. | 369/30 |

FOREIGN PATENT DOCUMENTS

| | | | |
|---|---|---|---|
| 455934A2 | 11/1991 | European Pat. Off. | 369/30 |
| 250352 | 2/1990 | Japan | 369/30 |
| 334179 | 2/1991 | Japan | 369/30 |
| 414667 | 1/1992 | Japan | 369/30 |
| 2218559 | 11/1989 | United Kingdom | 369/30 |

*Primary Examiner*—Georgia Y. Epps
*Assistant Examiner*—Tan Dinh
*Attorney, Agent, or Firm*—Perman & Green

[57] ABSTRACT

A recording medium playing apparatus which is capable of shortening the time required for operating the installation of recording media, and also, of accommodating a plurality of recording media in an accommodating section freely. A plurality of recording media are accommodated in an accommodating section together with a correlative position information recording medium which is recorded relation information related to the recorded contents of each of the plurality of recording media, and correlative position information indicating correlative positions of the plurality of recording media at the time of the accommodated condition, and then, the correlative position information and the relation information reproduced by playing means from the correlative position information recording medium are interrelatedly hold in a memory with respect to a plurality of recording media.

2 Claims, 14 Drawing Sheets

FIG.6

| TRAY ADDRESS | INSTALLATION COMPLETION FLAG | MUSIC SELECTION NUMBER | CORRELATIVE POSITION INFORMATION | TRACK NUMBER | TITLE OF MUSIC |
|---|---|---|---|---|---|
| ⋮ | ⋮ | ⋮ | ⋮ | ⋮ | ⋮ |
| N+1 | 0 | — | — | — | — |
| N | 1 | 100-01 | 1 | 5 | ×× × |
| | | 100-02 | 1 | 11 | ×○○ |
| | | 100-03 | 2 | 3 | △×○ |
| | | ⋮ | ⋮ | ⋮ | ⋮ |
| N−1 | 1 | — | — | — | — |
| N−2 | 1 | — | — | — | — |
| N−3 | 1 | — | — | — | — |
| ⋮ | ⋮ | ⋮ | ⋮ | ⋮ | ⋮ |
| 1 | 0 | — | — | — | — |

FIG. 8

| ORDER OF PERFORMANCE | MUSIC SELECTION NUMBER |
|---|---|
| 1 | 100-02 |
| 2 | 200-11 |
| 3 | 150-03 |
| 4 | 100-07 |
| ⋮ | ⋮ |

FIG.14

| TRAY NUMBER | INSTALLATION COMPLETION FLAG | MUSIC INFORMATION |
|---|---|---|
| 1 | 1 | CONTENTS OF INSTRUMENTAL ACCOMPANIMENT INFORMATION FILE A |
| 2 | 1 | CONTENTS OF INSTRUMENTAL ACCOMPANIMENT INFORMATION FILE A1 |
| 3 | 1 | CONTENTS OF INSTRUMENTAL ACCOMPANIMENT INFORMATION FILE A2 |
| 4 | 1 | CONTENTS OF INSTRUMENTAL ACCOMPANIMENT INFORMATION FILE A3 |
| 5 | 1 | CONTENTS OF INSTRUMENTAL ACCOMPANIMENT INFORMATION FILE A4 |
| 6 | 1 | CONTENTS OF INSTRUMENTAL ACCOMPANIMENT INFORMATION FILE A |
| 7 | 1 | CONTENTS OF INSTRUMENTAL ACCOMPANIMENT INFORMATION FILE A1 |
| 8 | 0 | — |
| ⋮ | ⋮ | |

5,467,326

APPARATUS FOR SELECTIVELY PLAYING A RECORDING MEDIUM

BACKGROUND OF THE INVENTION

1. Field of the Invention

The present invention relates to an apparatus for playing a recording medium, having a plurality of recording media on which the sounds of musical performance and the like are recorded and selectively playing a recording medium from among the plurality of recording media.

2. Description of the Related Art

As an apparatus for playing a recording medium, there is a karaoke reproducing apparatus. The karaoke reproducing apparatus is accommodated with a plurality of recording media on which sounds of karaoke music (instrumental accompaniment) are recorded, and at a plying mode, extracts a recording medium on which sound of a selected piece of karaoke music is recorded, from the plurality of the recording media, and plays the selected piece of music. Also, there is a jukebox as an apparatus having a structure similar to that of the karaoke reproducing apparatus.

In these recording medium playing apparatuses including the karaoke reproducing apparatus, there is a need for performing an operation of installation whenever a recording medium is newly accommodated so as to store information related to the contents of the recording medium as well as the accommodating position thereof in a memory. The installation operation is carried out so as to execute a quick-access to the portion where sound of a selected piece of music is recorded on a recording medium which has been chosen from a plurality of recording media. This selection of a recording medium should be made immediately after any one piece of music is selected.

In the conventional apparatus for playing a recording medium, when the installation operation is carried out by newly accommodating recording media, the recorded contents of the accommodated recording media should be read every recording medium. Inevitably, there is a problem that it takes a time. In addition to this problem, the recording media should be placed in a predetermined position in the accommodating section arranged for each of the recording media. Therefore, it lacks flexibility in placing them in such a position.

SUMMARY OF THE INVENTION

It is therefore an object of the present invention to provide a recording medium playing apparatus which can shorten the operation time for installing the recording media, and can be freely accommodated with a plurality of recording media in a desirable position in an accommodating section.

To achieve the above object, an apparatus for playing recording media according to the present invention comprises an accommodating section for accommodating a plurality of recording media, memory means for storing relation information related to the recorded contents of each of the plurality of recording media, and position information indicating the position of each of the plurality of recording media, and means for selectively playing a recording medium from the plurality of recording media in accordance with an instruction while referring to the stored contents of the memory means, wherein at least one of the plurality of recording media is a correlative position information recording medium for recording the relation information of each of the plurality of recording media, and correlative position information indicating correlative positions of each of the plurality of recording media at the time of being accommodated, and the memory means interrelatedly stores in memory the correlative position information and the relation information of the plurality of recording media reproduced by the playing means from the correlative position information recording medium.

In the apparatus for playing recording media according to the present invention, a plurality of recording media are accommodated in an accommodating section together with a correlative position information recording medium which is recorded relation information related to the recorded contents of each of the plurality of recording media, and correlative position information indicating correlative positions of the plurality of recording media at the time of the accommodated condition, and then, the correlative position information and the relation information reproduced by playing means from the correlative position information recording medium are interrelatedly hold in a memory with respect to a plurality of recording media.

BRIEF DESCRIPTION OF THE DRAWINGS

FIG. 6 is a view showing an information table for pieces of music;

FIG. 8 is a view showing a listed table for selecting pieces of music;

FIG. 14 is an information table for pieces of music provided for the apparatus represented in FIG. 11.

DETAILED DESCRIPTION OF THE PREFERRED EMBODIMENTS

A preferred embodiment of the present invention will be described below referring to the accompanying drawings.

Figure 1:
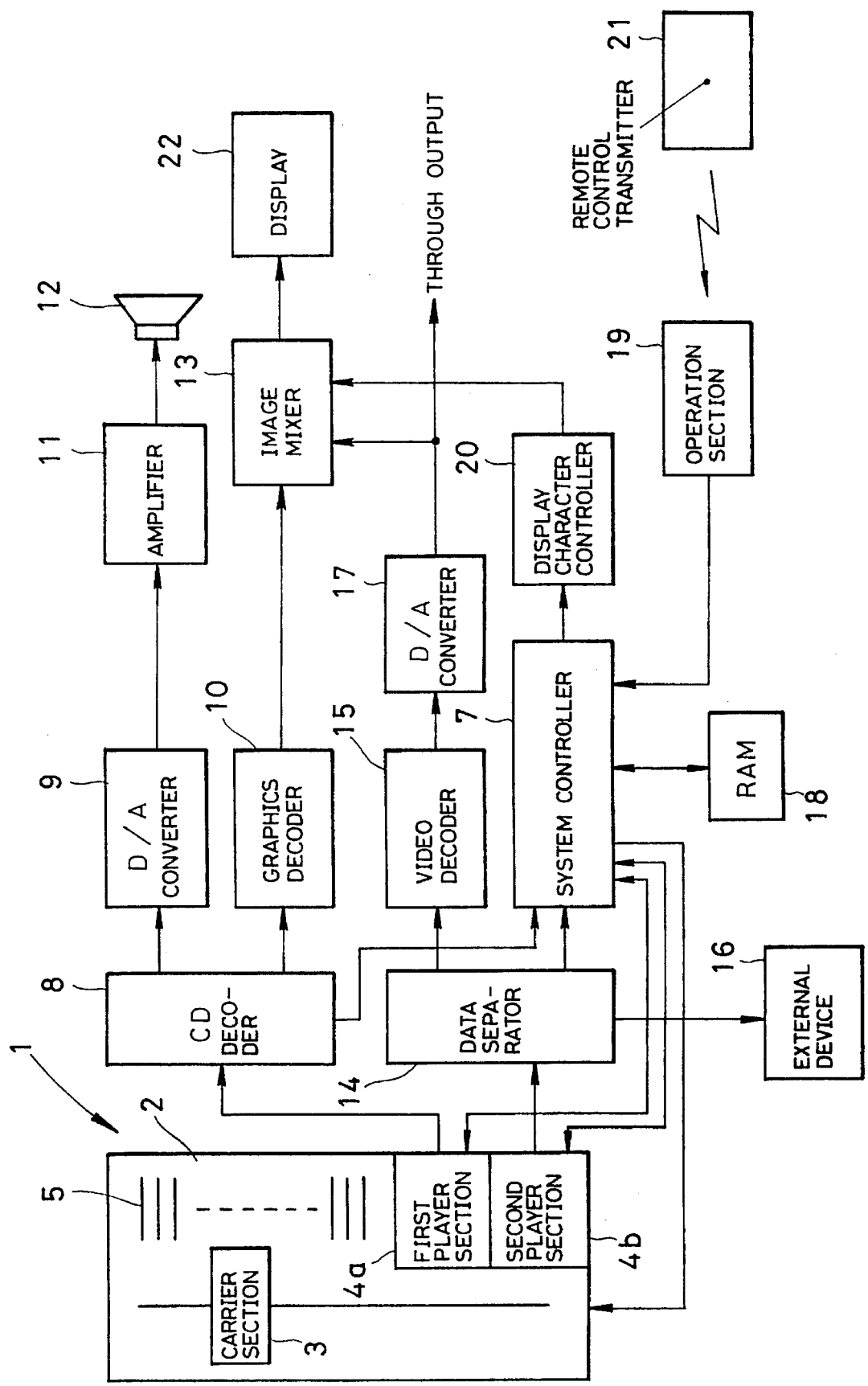
FIG. 1 is a block diagram showing an embodiment according to the present invention.

In a karaoke reproducing apparatus shown in FIG. 1 as an embodiment of an apparatus for playing a recording medium according to the present invention, an autochanger 1 comprises a disk accommodating section 2, a disk carrier section 3 and two player sections 4a and 4b. The first player section 4a plays the so-called CD-G disk on which in the main code area thereof, voice data on instrumental accompaniments are recorded while in the sub-code area, graphics data on the words of songs are recorded, respectively. The second player section 4b plays a disk on which compressed image data representing background images, control data, information data, and others are recorded (hereinafter referred to as background image disk). In the disk accommodating section 2, a plurality of disks 5, CD-G disks and background image disks, are accommodated. Trays (not shown) are arranged in each accommodating position of the disks for placing them. For all the trays, tray numbers are provided in number order beginning from 1, for instance. When the disks are played, two disks (each one of the CD-G and background image disks) from the plurality of disks 5 are fed no the turntables (not shown) of the player sections 4a and 4b by the disk carrier section 3. When the playing terminates, each of the disks on the turntables is brought back to a given position in the disk accommodating section 2 by the carrier section 3. The player sections 4a and 4b output the data read from the disks by playing the disks on the turntables, respectively. The disk carrier section 3 and player sections 4a and 4b operate in accordance with instructions from a system controller 7 which will be described later.

A CD decoder 8 is connected to the data output of the first player section 4a, and demodulates the data output from the first player section 4a to obtain audio data on the main code and graphics data on the sub-code, respectively. The audio data is supplied to a D/A converter 9 while the graphics data, to a graphics decoder 10. In the D/A converter 9, the analog data is converted into an analog audio signal. The analog audio signal is supplied to a speaker 12 through an amplifier 11. The graphics decoder 10 converts the graphics data into a graphic image signal to supply them to an image mixer 13.

A data separator 14 is connected to the data output of the second player section 4b, separates the data output from the second player section 4b to various types of data such as compressed image data, control data, information data, and others, respectively, and outputs each of them from the respective output terminals independently. To the data separator 14, a video decoder 15 is connected in addition to the above-mentioned system controller 7. Also, for the data separator 14, terminals are provided in order to connect an external device 16 to it. The external device 16 is a controller dedicated to performing the instrumental accompaniments, which controls illumination, images, superimposition, and others.

The video decoder 15 decodes the compressed image data thus separated to reconstruct it as non-compressed image data. The image data output from the video decoder 15 is supplied to a D/A converter 17 so that the data is converted into an analog background image signal. The background image signal is output through as it is, and at the same time, supplied to the image mixer 13.

The system controller 7, consisted of a microcomputer, receives the separated information data. The information data is stored in a RAM (Random Access Memory) 18, and also, is selectively read from the RAM 18. The information data thus read is processed in the system controller 7 and supplied to a controller 20 for displaying characters. The display character controller 20 is provided with a character generator for generating character data indicative of the characters to be displayed corresponding to the information data, and a V-RAM (Video-Random Access Memory) in which the character data is written. The written character data is read from the V-RAM in synchronism with the synchronizing signal of the above-mentioned background image signal. The read data is converted into a character image signal and output to the image mixer 13. The character image signal is mixed by the image mixer 13 with the background image signal from the D/A converter 17 or the graphics image signal from the graphics decoder 10.

The system controller 7 is connected with an operation section 19. The operation section 19 has a keyboard (not shown) for designating a piece of music to be played back and a receiver (not shown) for receiving a music designation signal transmitted from a remote control transmitter 21.

Figure 2:
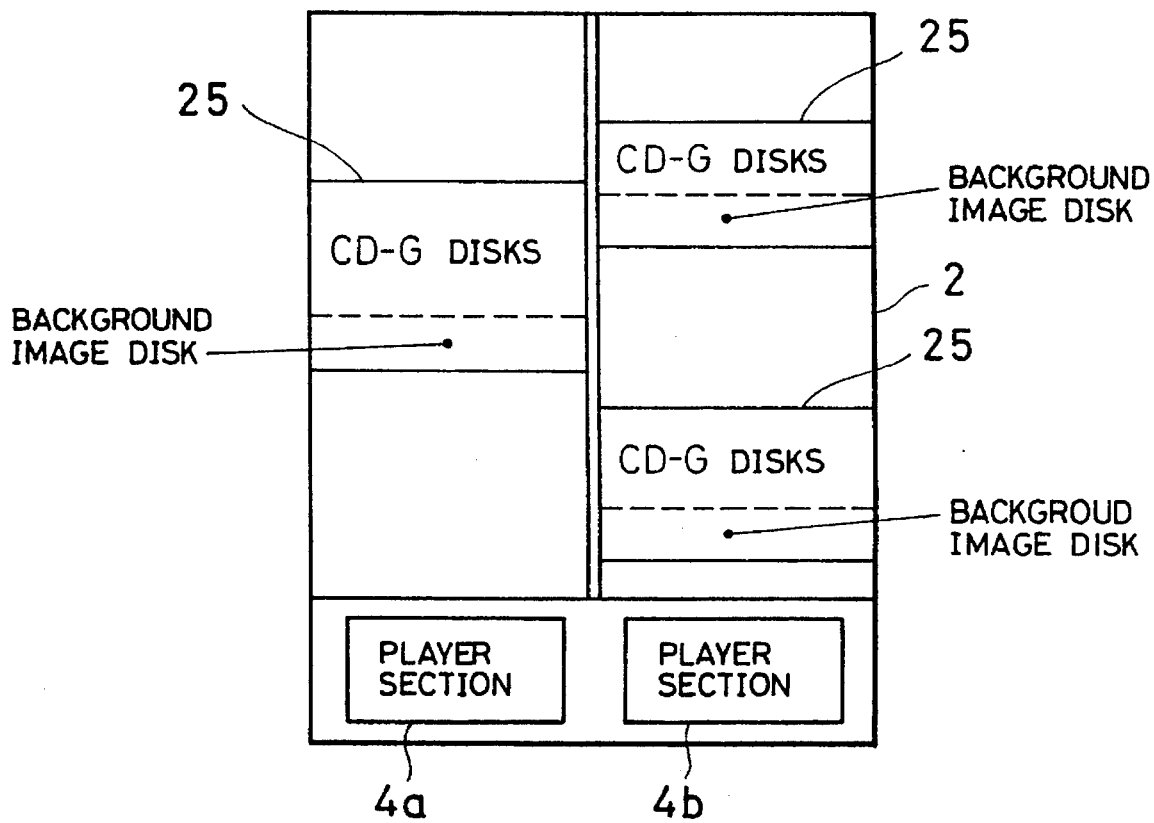
FIG. 2 is a view showing the arrangement of packs in a disk accommodating section.
Figure 3:
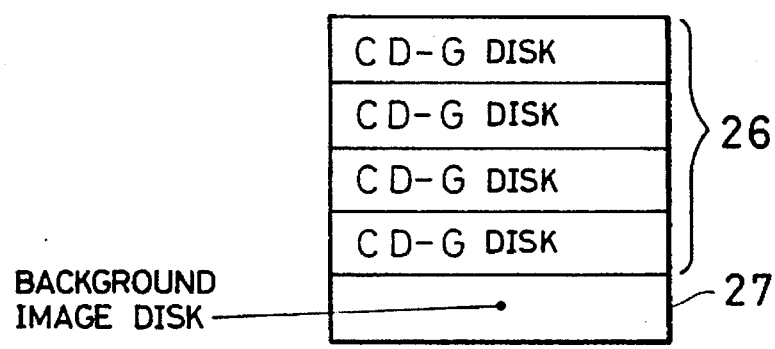
FIG. 3 is a view showing the structure of one pack.

In the disk accommodating section 2 of the autochanger 1, a plurality of packs 25 are accommodated as shown in FIG. 2. Each pack contains a plurality of CD-G disks and one background image disk. According to an example shown in FIG. 3, four CD-G disks 26 and a background image disk 27 are packed. The maximum number of CD-G disks per pack is predetermined, but any number of CD-G disks can be retained per pack for actual use if it is less than the maximum number.

Figure 4:
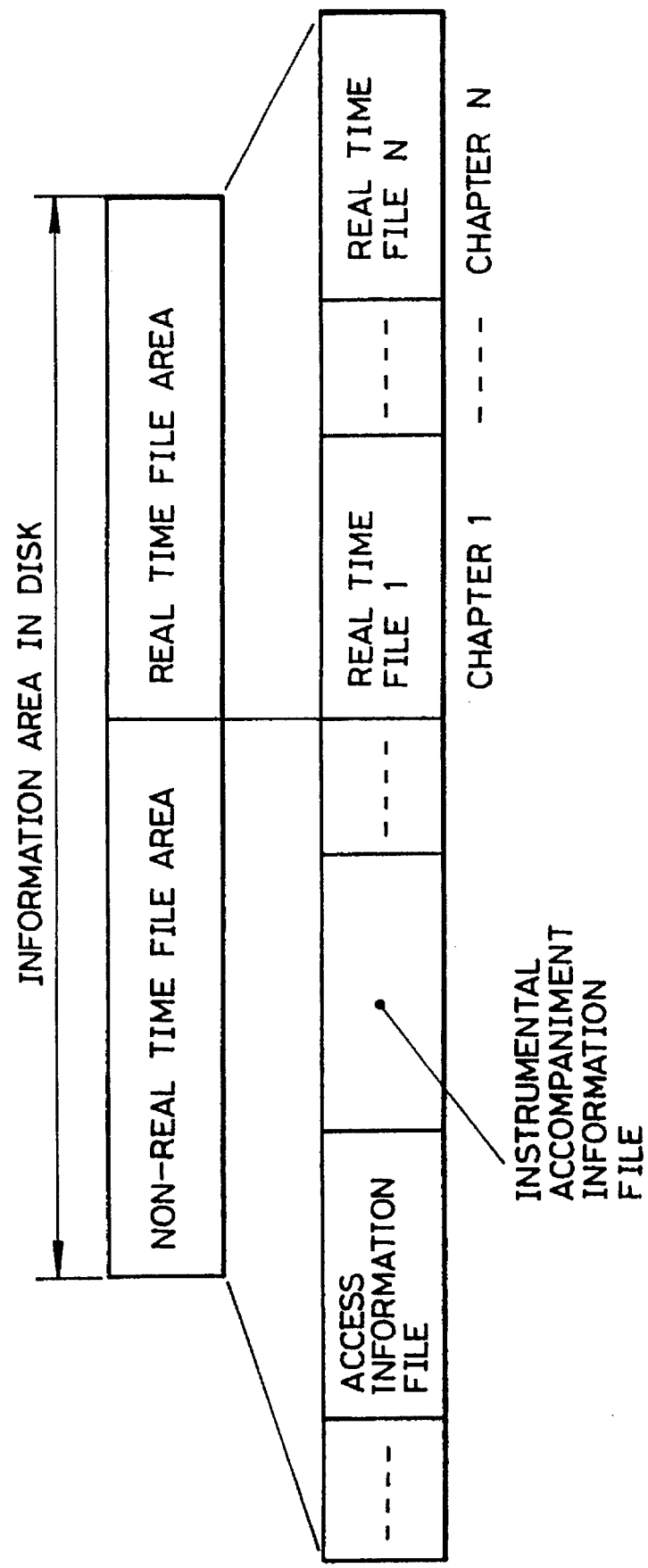
FIG. 4 is a view showing the constitution of a disk information area.

Information concerning pieces of music recorded on the respective CD-G disks in a pack is recorded on the background image disk in that pack. On the background image disk, all the information is recorded by digital signal. As shown in FIG. 4, an information recording area in the background image disk has a non-real time file area and a real time file area. The non-real time file area is recorded with access information files such as TOC, and instrumental accompaniment information files such as titles of music. In the real time file area, digitalized background image signals, and real time data for controlling the external device 16 are recorded by means of time-division multiplex.

The access information file includes data representing the positions, time lengths, and others in the real time file area. The instrumental accompaniment information file includes the selection numbers of recorded pieces of music on the CD-G disks belonging to one pack, information regarding correlative positions, track numbers, and various other information regarding pieces of music such as the titles of music. These are recorded per music selection number. The information regarding the correlative positions is defined for each of the CD-G disks, which represents the tray numbers from the tray arranged for the background image disk to the trays arranged for the CD-G disks in one pack. For example, the correlative position information corresponding to a tray arranged for a CD-G disk is defined as 1 or −1 when it is positioned next to the tray arranged for the background image disk. The positive or negative sign of the correlative position information is set in accordance with the position where the background image disk is located in that pack. The track number indicates the recorded order corresponding to a piece of music designated by a selection number on the CD-G disk which contains that music.

The operation of the above-mentioned karaoke reproducing apparatus will be described.

Figure 5:
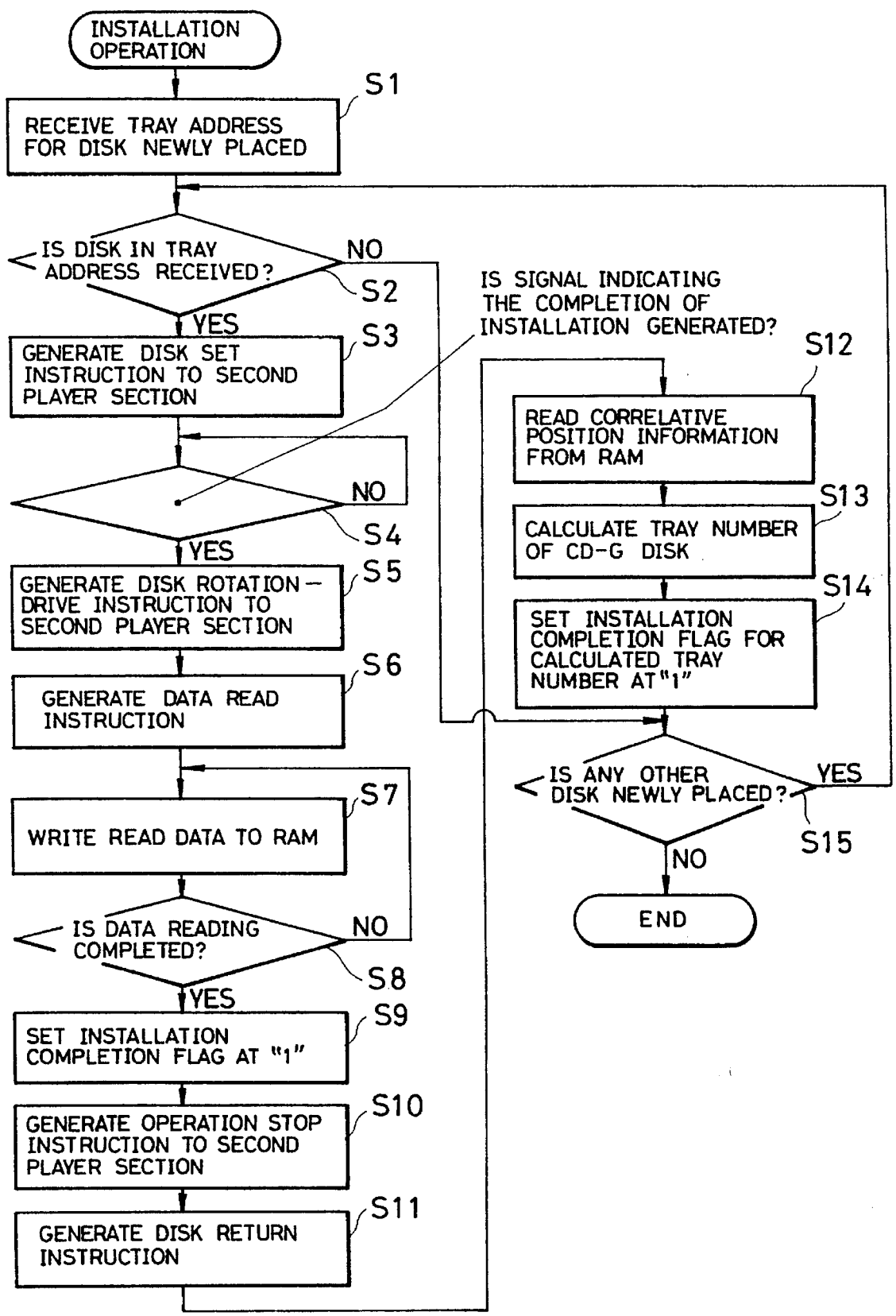
FIG. 5 is a flowchart showing an operation of installation.

When a disk is newly placed in the disk accommodating section 2 of the autochanger 1, installation operation is executed at first. The installation operation is conducted per pack. In other words, as shown in FIG. 5, the system controller 7 receives a tray address to be accommodated in the disk accommodating section 2 (step S1). This is input by the user through the keys on the operation section 19 as required. The input address is the tray address in the location where the background image disk is accommodated. When the tray number is received, the controller 7 determines whether or not a disk is accommodated in the position indicated by the tray number (step S2). Although not shown, this identification is performed in accordance with an output from a switch provided for each of the trays. The switch is caused to turn on or off in response to the presence of a disk.

When the presence of a disk is detected in the position indicated by the input tray number, the controller 7 generates a disk setting instruction to the disk carrier section 3 in order to feed that particular disk for its setting on the turntable of the second player section 4b (step S3).

When the disk carrier section 3 completes setting the disk on the turntable of the second player section 4b, this event is represented by a signal indicating the completion of setting, and transferred to the system controller 7. Obtaining the signal indicating the completion of setting (step S4), the system controller 7 generates an instruction to the second player section 4b to drive and rotate the disk (step S5), and also, to read the data (step S6). The second player section 4b rotates the turntable together with the disk, and outputs the data read from the non-real time file area of the disk after the rotation of the disk reaches a given revolution. The data thus read is supplied to the system controller 7 through the data separator 14, and provisionally stored in the buffer memory (not shown) in the system controller 7. Among the data supplied, the system controller 7 writes, for each music, the selection number, the information regarding the correlative positions, the track number, and the title of music in the external RAM 18 in storing positions corresponding to the input tray number (step S7). If, for example, the tray number input at the step S1 is N as shown in FIG. 6, 100-01, 100-02, 100-03, . . . are written as the music selection numbers, 1, 1, 2, . . . as the correlative positions, and 5, 11, 3, . . . , as the track numbers corresponding to the tray number N, respectively. In this way, the music information table is formed. The correlative position information and track numbers exist as many as the corresponding music selection numbers.

After the execution of the step S7, the controller 7 determine whether or not the data has been read in the player section 4b (step S8). For example, the data writing to the RAM 18 is executed at the step S7 until when a bit indicating the completion of data supply is given so that it is known that the data reading is terminated. When the data reading is terminated, the flag indicating the completion of installation is set at "1" with respect to the input tray number in the music information table (step S9). The initial value is "0" for the installation completion flag. Therefore, in the example shown in FIG. 6, the flag is set at "1" with respect to the tray number N. After that, an instruction is issued to the second player section 4b for stopping its operation (step S10), while a disk return instruction is issued to the disk carrier section 3 (step S11). Thus, the second player section 4b stops driving the turntable to rotate, and then, the disk carrier section 3 transports the disk from the turntable to a given accommodating position of that particular disk in the disk accommodating section 2, and accommodates it.

The system controller 7 reads one after another each of the correlative position information written in the RAM 18 (step S12), calculates each tray number of the CD-G disks (step S13), and sets the installation completion flag at "1" with respect to the tray number thus calculated (step S14). Given the correlative position information as m, a value of N–m, which is obtainable by the tray number N subtracted by the correlative position information m, is the tray number for that particular CD-G disk. If, for example, the correlative position information is defined as 1 for a CD-G disk, a value of N–1 becomes the tray number for that disk. The correlative position information exists as many as the numbers of CD-G disks in one pack. Therefore, if three CD-G disks exist, the numbers of correlative position information are also three, as 1, 2, and 3. The tray numbers are obtained as N–1, N–2, and N–3, too. Then, as shown in FIG. 6, the flag indicating the completion of installation is set at "1" in the corresponding position in the music information table formed in the RAM 18.

After executing the step S14, the system controller 7 determines whether or not any disk is newly accommodated in addition to the current one (step S15). If a plurality of tray numbers are input at the step S1, there should be some other disks newly accommodated in the disk accommodating section 2. The process proceeds to step S2 where it is determined whether or not any disk is accommodated in the location corresponding to the tray number which is received subsequently. Then, the above-mentioned operation will be repeated. If there is no other disk newly accommodated, the current operation of installation is terminated.

Incidentally, it should be noted that if a switch is provided and an arrangement is made to turn it on when the background image disk is accommodated in any one of the tray positions in the disk accommodating section 2, the tray number where the background image disk is accommodated is known by use of such a switch at the time of installation. Therefore, it is unnecessary for the user to operate any key to input the tray number.

Figure 7:
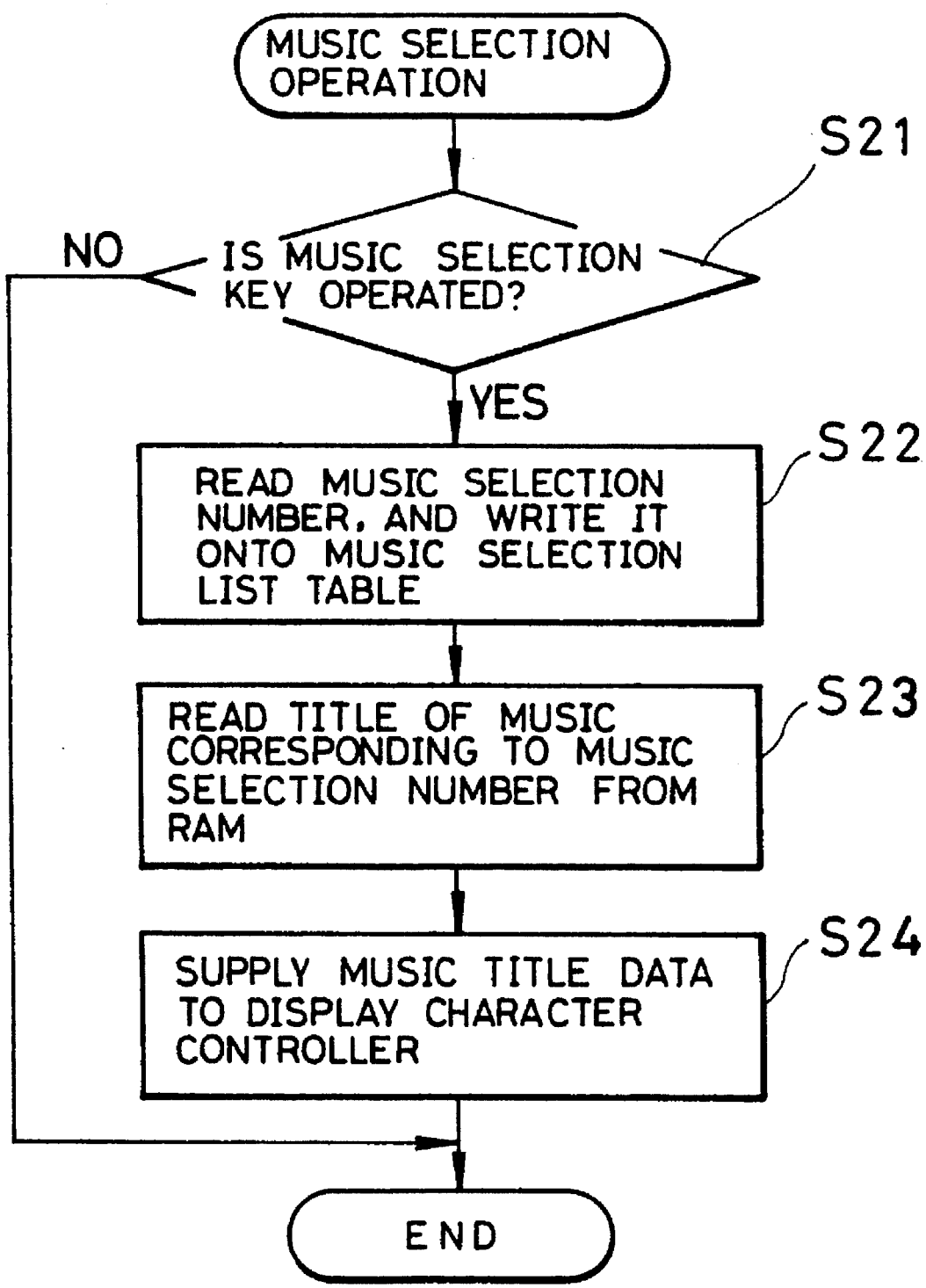
FIG. 7 is a flowchart showing the operation of selecting pieces of music.

Once the operation of installation is completed as described above, the instrumental accompaniments can be performed in relation to music selected by the user. At first, the user operates the numerical keys or alphabetical keys of the operation section 19 or the remote control transmitter 21 to input the music selection number. The music selection number is formed by a plurality of digits including a hyphen such as 100-01 mentioned above. This number is used to specify a pack and some music recorded on disks in the pack. When the keys are operated by the user, the number is held in a buffer (not shown) in the operation section 19. As shown in FIG. 7, the system controller 7 determines whether or not the music selection keys (not shown) in the operation section 19 are operated by the application of a given timing or an interrupting action (step S21). If the music selection keys are operated, the music selection number is read from the aforesaid buffer to write it onto a list table for selected pieces of music in the RAM 18 (step S22). The music selection list table is formed in the RAM 18, and as shown in FIG. 8, the music selection numbers are written in the order of playback performances. Whenever a playback performance is over, such order of performances is shifted up one by one. The title of the music corresponding to the music selection number thus read is read from the music information table in the RAM 18 (step S23). The music title which is read as data is supplied to the display character controller 20 (step S24). In the display character controller 20, displaying character data indicative of the music title is generated and written in a given position on the V-RAM. From the V-RAM, the written displaying character data is read, and output to the image synthesizer 13 after being converted into a character image signal. In the image synthesizer 13, if the character image signal indicates a given color, the signal is output from the D/A converter 17 in place of the background image signal, thus being mixed with the background image signal. As a result, the music title is represented as a character image on the display 22 to make it possible to confirm that the music selected by the key operation is accepted.

Figure 9:
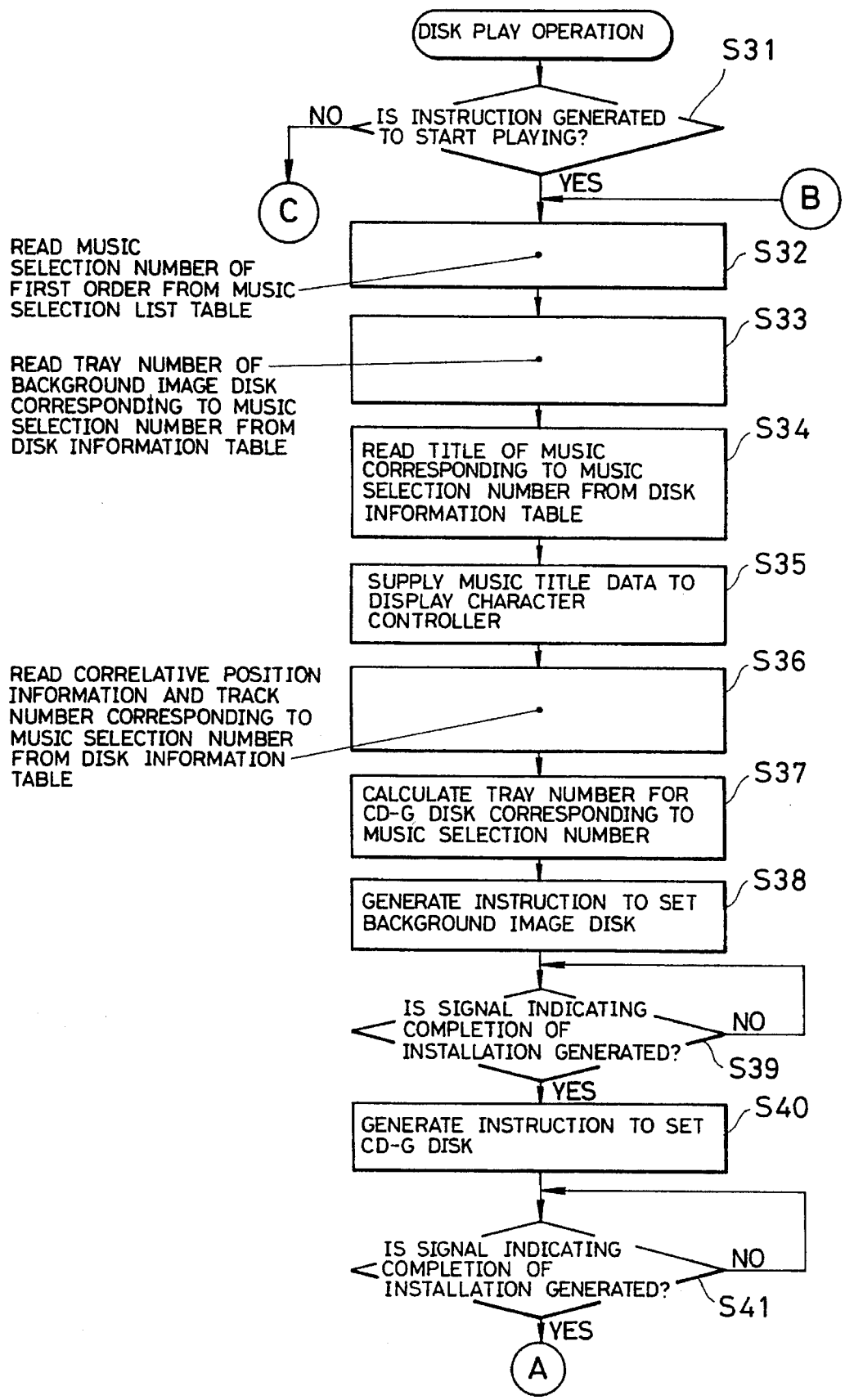
FIG. 9 is a flowchart showing the operation of disk play.
Figure 10:
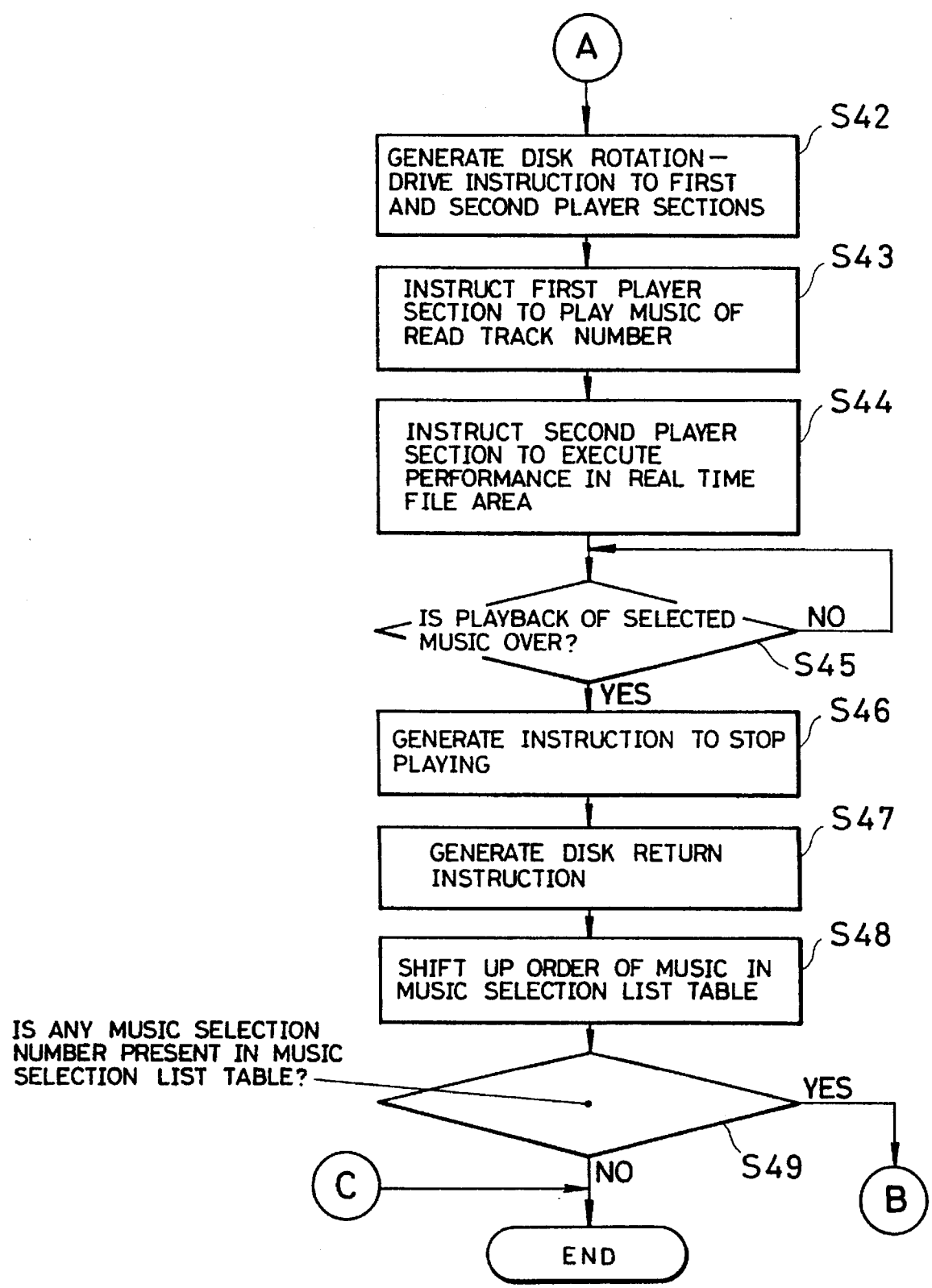
FIG. 10 is a flowchart showing the continued portion of the operation of disk play represented in FIG. 9.

Next, the operation of playing disks will be described. As shown in FIGS. 9 and 10, when an instruction for starting performance is given through the key operation in the operation section 19 (step S31), the system controller 7 reads at first the music selection number corresponding to the first number in the order of performances in the list table for selecting pieces of music formed in the RAM 18 (step S32).

Then, the controller 7 reads the tray number of the background image disk corresponding to the read music selection number, from the music information table in the RAM 18 (step S33), and further, reads the title of the music corresponding to the read music selection number, from the music information table in the RAM 18 (step S34), to supply the title of the music as read data to the display character controller 20 (step S35). In this way, the music title is represented as a character image on the display 22, hence making it possible to recognize the next music of instrumental accompaniment by vision.

The system controller 7 reads the correlative position information regarding and track number corresponding to the read music selection number, from the music information table (step S36), and calculates the tray number of the CD-G disk for the music selection number from the tray number of the background image disk and the correlative position information (step S37). This calculation of the tray number for the CD-G disk is made in the same manner as-the step S13, and given the tray number of the background image disk obtained at the step S33 as N, and the correlative position information obtained at the step S36 as m, respectively, the tray number of the CD-G disk corresponding to the music selection number is a value of N–m which is obtainable by subtracting the correlative position information m from the tray number N. After the tray number of the CD-G disk is calculated, a disk setting instruction is issued to the disk carrier section 3 (step S38) in order to install the disk carrying the read tray number of the background image disk, on the turntable of the second player section 4b. When the disk carrier section 3 completes the installation of the disk on the turntable of the second player section 4b, a signal indicating the completion of installation is supplied to the system controller 7. When the system controller 7 receives the installation completion signal (step S39), it generates a disk setting instruction to the disk carrier section 3 (step S40) in order to install, on the turntable of the first player section 4a, the disk carrying the calculated tray number of the CD-G disk. When the disk carrier section 3 completes installing the disk on the turntable of the first player section 4a, a signal indicating the completion of installation is supplied to the system controller 7.

When the system controller 7 receives the installation completion signal (step S41), it generates instructions to the first and second player sections 4a and 4b in order to drive the disks to rotate (step S42). The system controller 7 instructs the first player section 4a to play the disk in relation to the music corresponding to the read track number (step S43) and the second player section 4b to play the disk in relation to the real time file area (step S44). In this way, the first player section 4a starts playing the music designated by the music selection number, and audio data is supplied to the amplifier 11 from the CD decoder 8 through the D/A converter 9 as an analog audio signal thereby to drive the speaker 12. Graphics data from the CD decoder 8 is supplied to the image mixer 13 through the graphics decoder 10 as a graphics image signal. Also, the second player section 4b outputs compressed image data. The compressed image data is converted into an analog background image signal through the data separator 14, video decoder 15 and D/A converter 17, and supplied further to the display 22 through the image mixer 13. In this way, on the display 22, the words of the song are represented while being superimposed on the background image.

After the execution at the step S44, the system controller 7 determines whether or not the playback of the selected music is terminated (step S45). This is determined by time information in the control data being supplied from the CD decoder 8 by means of the disk playback. When the playback of the selected music is over, the system controller instructs the player sections 4a and 4b to stop its playing (step S46), and generates a disk return instruction to the disk carrier section 3 (step S47). Then, the players 4a and 4b stop the operation of disk playbacks. After the rotation of turntables stops, the disk carrier section 3 transports the disks from each of the turntables of the player sections 4a and 4b to given accommodating positions in the disk accommodating section 2 to place them, respectively. After generating the disk return instruction, the system controller 7 shifts up the order of pieces of music in the music selection list table by a portion equivalent to a piece of music (step S48), and determines whether or not a music selection number is recorded on the first order of music selection list table (step S49). If a music selection number is recorded, the process will return to the step S32 to repeat the above-mentioned operation. On the other hand, if no selection number for any music is recorded, the operation of the music performance is terminated.

In this respect, the disks in each pack are accommodated directly in the disk accommodating section 2 according to the above-mentioned embodiment, but it may be possible to use a magazine in which disks can be detachably installed, and accommodate a plurality of CD-G disks and one background image disk in one magazine per pack, thus accommodating disks in the disk accommodating section 2 by the unit of magazines.

Also, according to the present invention, it is merely required that as an arrangement if at least one group of a plurality of recording media (disks), which includes at least one background image disk serving as a medium for recording correlative positions, is placed in a series of accommodating positions.

Figure 11:
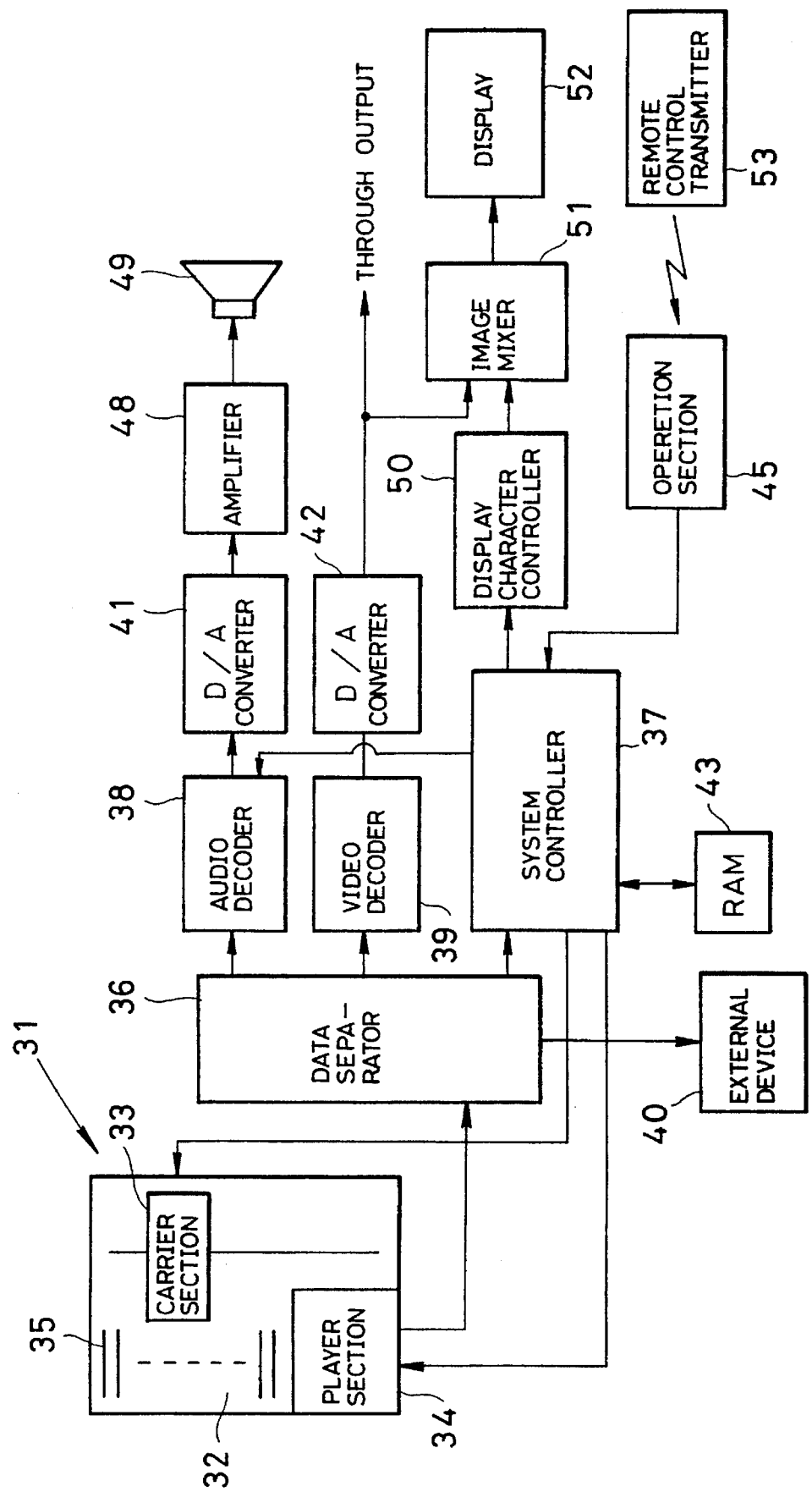
FIG. 11 is a block diagram showing another embodiment according to the present invention.

FIG. 11 is a view showing another embodiment according to the present invention. In the karaoke reproducing apparatus shown in FIG. 11, an autochanger 31 includes a disk accommodating section 32, a disk carrier section 33, and a player section 34. In the disk accommodating section 32, a plurality of disks 35 are accommodated, and trays (not shown) are arranged for placing each of the disks per disk accommodating position. For all the trays, tray numbers are provided in number order beginning from 1, for instance. In playing a disk, one disk is transported from a plurality of disks 35 onto the turntable (not shown) of the player section 34 by the disk carrier section 33. When the performance is over, the disk is returned from turntable to the given position in the disk accommodating section 32 by the disk carrier section 33. The player section 34 plays the disk on the turntable and outputs data read from the disk. The disk carrier section 33 and the player section 34 operate in accordance with the instructions generated by a system controller 37 which will be described later.

A data separator 36 is connected to the data output of the player section 34. The data separator 36 separates the data output from the player section 34 into various data such as compressed image data, compressed audio data, real time data, control data and information data, and outputs them from individual output terminals. In addition to system controller 37, an audio decoder 38 and a video decoder 39 are connected to the data separator 36. Also, for the data separator 36, terminals are provided for connecting an external device 40 to it.

The audio decoder 38 decodes the compressed audio data thus separated and restores them to the non-compressed voice data such as PCM digital data. Since the voice data of a plurality of channels are compressed in the compressed audio data, the audio data of designated channel is restored in accordance with signals from the system controller 37. The audio data output from the audio decoder 38 is supplied to the D/A converter 41 and converted into an analog audio signal. The arrangement is made to supply the analog audio signal to a speaker 49 through an amplifier 48.

The video decoder 39 decodes the compressed image data which is also separated, and restores it as the non-compressed image data. The image data output from the video decoder 39 is supplied to the D/A converter 42 for converting them into an analog animation image signal. The animation image signal is output through as it is in addition to being supplied to an image mixer 51.

The system controller 37, constituted of a microcomputer, receives the separated information data. The information data is stored in the RAM 43, and also, read from the RAM 43 selectively. The read information data is processed in the system controller 37 or supplied to a display character controller 50. The display character controller 50 comprises a character generator and V-RAM to generate display character data corresponding to the information data, and write it onto the V-RAM. In synchronism with the synchronizing signals of the animation image signal, the display character controller reads from the V-RAM the display character data which is converted into character image signals and output to the image synthesizer 51. The character image signals are synthesized by the image synthesizer 51 with the animation image signals output from the D/A converter 42.

An operation section 45 is connected to the system controller 37. The operation section 45 has a key board for designating a piece of music to be played and receiving section (not shown) for accepting the music designation made through a remote control transmitter 53.

Now, the description will be made of the recorded contents of a disk 35 to be played by the player section 34. Pieces of information are all recorded on each disk 35 in the form of a digital signal. In the same manner as the background image disk shown in FIG. 4, the information recording area on each disk 35 has a non-real time file area and a real time file area. An access information file such as TOC and the information files for instrumental accompaniments such as titles of music are recorded, while in the real time file area, N numbers of real time files (N is an integer corresponding to the number of pieces of music) are recorded in accordance with the standard of MPEG (Moving Picture Expert Group), for instance. Each real time file is a unit called "chapter" and one chapter corresponds to one piece of music. The real time file of one chapter comprises the compressed image data and compressed voice data of a piece of music, and real time data for controlling external devices. These data are recorded in the file by means of time-division multiplex. The real time data indicates the degrees of climax of music by sixteen stages, and also, indicates the starting time and length of such climax by a time unit (by a unit of frame, for instance).

The access information file includes information indicating the position of and the length of time for each chapter on the disk, and others. By referring to this information file, it is possible to access an arbitrary chapter. The information file for instrumental accompaniments includes various pieces of information regarding the track numbers, titles of music, and others per music selection number in accordance with each of chapters of the real time file. At least the information file A for instrumental accompaniments exists in any one of disks. In other words, one pack is formed by five disks, and the first disk has only the instrumental accompaniment information file A. The second disk has the instrumental accompaniment information file A1 of its own together with the instrumental accompaniment information file A of the first disk. The third disk has the instrumental accompaniment information files A2 of its own together with the information files A and A1 of the first and second disks. Likewise, the fourth disk has the instrumental accompaniment information file A3 of its own together with the information files A, A1 and A2 of the first to third disks. The fifth disk has the instrumental accompaniment information file A4 of its own together with the information files A, A1, A2, and A3 of the first to fourth disks. In the instrumental accompaniment information file A of each disk, the above-mentioned various pieces of information regarding music are recorded together with the last file number m of the other information file for instrumental accompaniments if any other instrumental accompaniment information file is recorded on that disk or example, in the instrumental accompaniment information file A of the second disk, the existence of A1 is recorded. Likewise, in the instrumental accompaniment information file A of the fifth disk, the existence of A4 is recorded.

In the disk accommodating section 32 of the autochanger 31, disks are placed in the order of tray numbers. Thus, one pack is formed for each five trays in such a manner as tray numbers 1 to 5, 6 to 10, . . . , and in each of the packs, the disks are stored as the first disk, second disk, . . . in that order.

Now, the description will be made of the operation of such karaoke reproducing apparatus.

Figure 12:
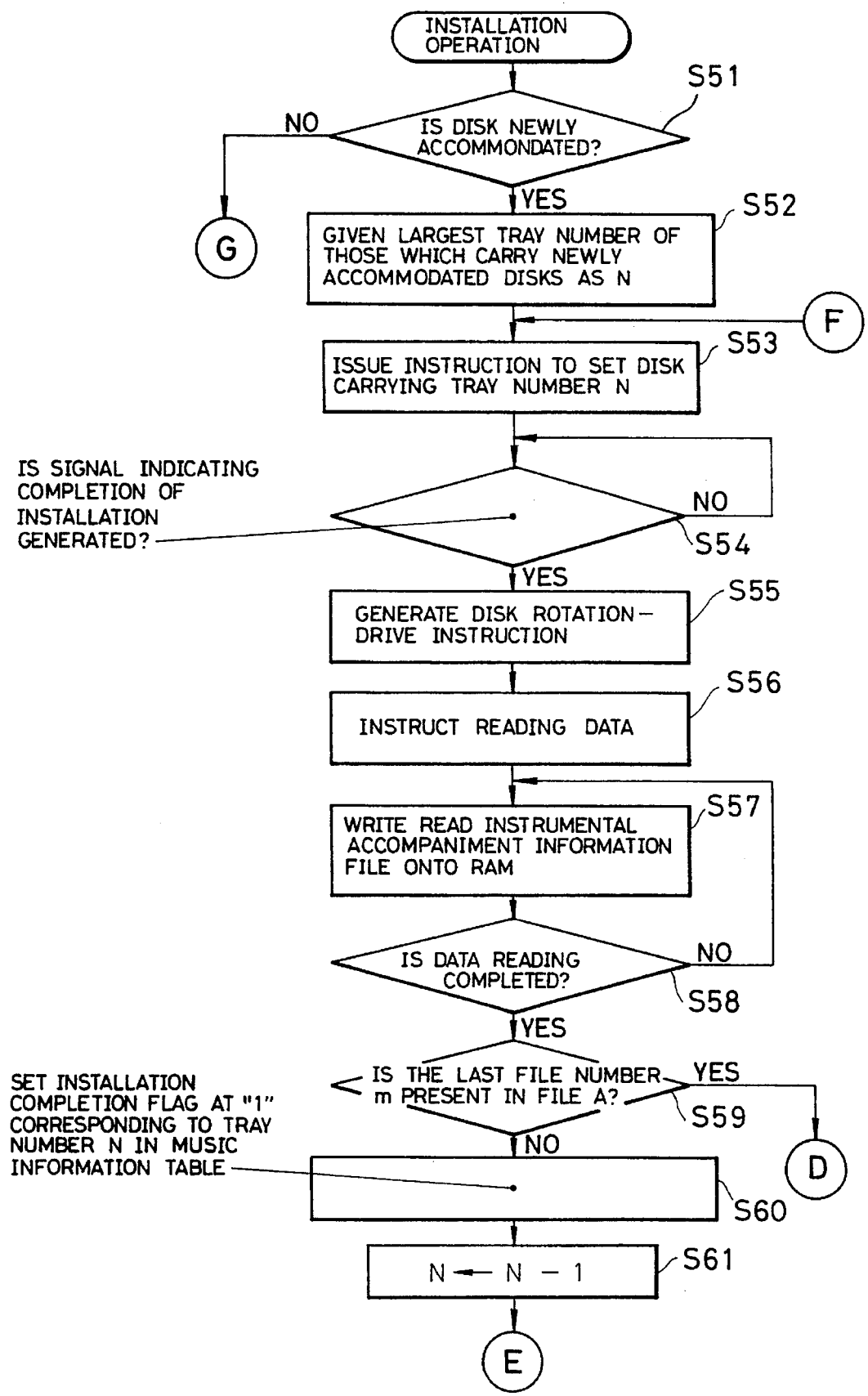
FIG. 12 is a flowchart showing the operation of installation for an apparatus represented in FIG. 11.
Figure 13:
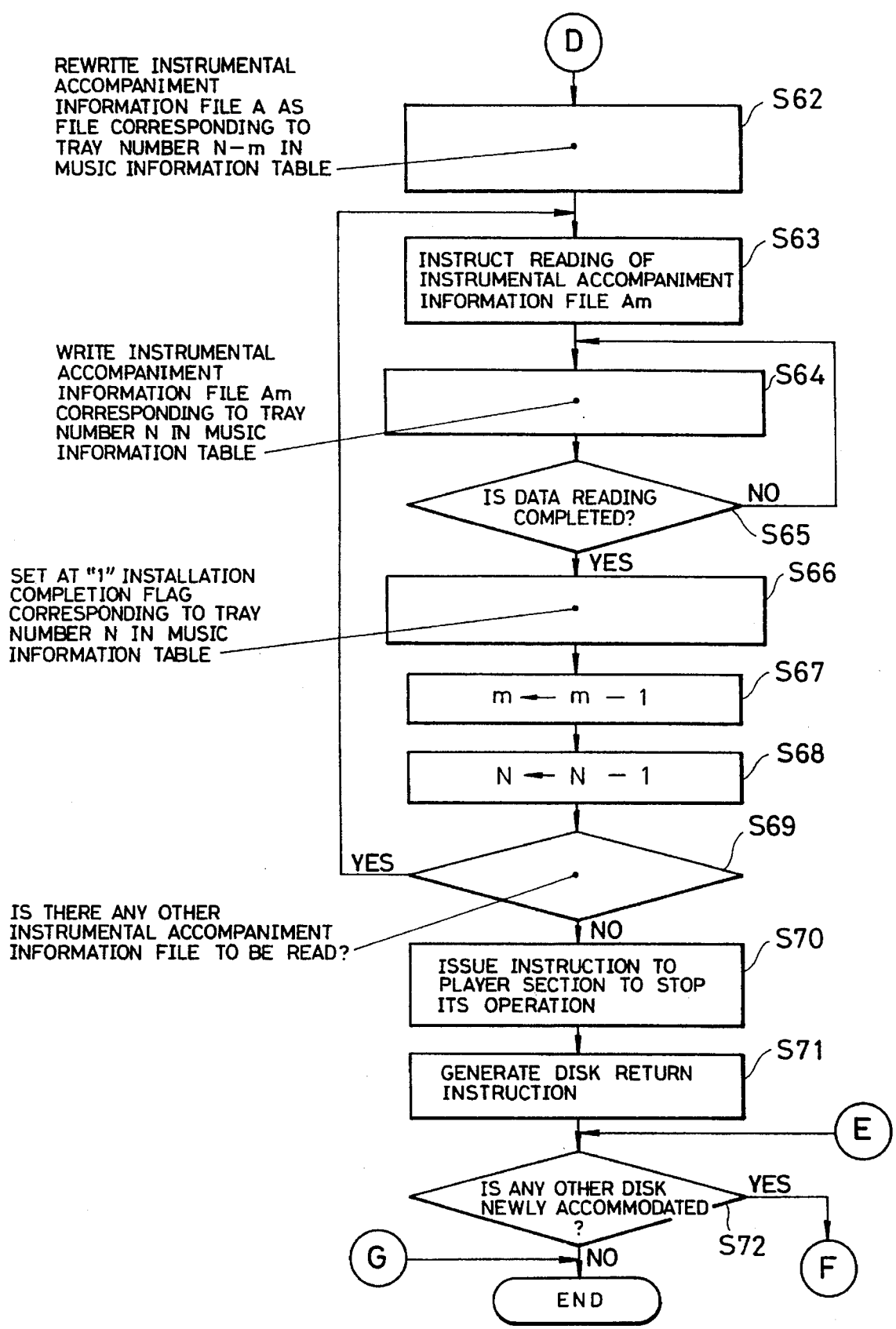
FIG. 13 is a flowchart showing the continued portion of the operation of installation represented in FIG. 12.

If a disk is newly accommodated in the disk accommodating section 32 of the autochanger 31, the operation of installation is executed at first. In this operation of installation, the system controller 37 detects the disk newly accommodated in the disk accommodating section 32 as shown in FIGS. 12 and 13 (step S51), and also, detecting the largest tray number of those of newly accommodated disks, the system controller 37 gives that tray number as N (step S52). Then, it generates disk set instruction to the disk carrier section 33 so that the disk carrying the tray number N is set on the turntable of the player section 34 (step S53). In the disk accommodating section 32, a switch (not shown) is provided for each tray. This switch is turned on when a disk is installed in that tray. With the output of the switch together with the condition of the flag indicating the completion of installation, it is determined whether or not the installed disk is the one which is newly accommodated.

The disk carrier section 33 operates in response to the disk set instruction, and when the disk carrying the tray number N is set on the turntable of the player section 34 completely, this event is given to the system controller 37 as a signal indicating the completion of installation. Therefore, obtaining the signal indicating the completion of installation (step S54), the system controller 37 instructs the player section 34 to drive the disk to rotate (step S55), and to read the data (step S56). The player section 34 rotates the disk together with the turntable, and after the rotation reaches at a given revolution speed, the player section 34 reads the instrumental accompaniment information file A from the non-real time file area, and outputs the data. The read information file A is supplied to the system controller 37 through the data separator 36, and provisionally stored in the memory buffer (not shown) in the system controller 37. The system controller 37 writes the data in the instrumental accompaniment information file A onto the RAM 43 one after another (step S57), and then, determines whether or not the player section 34 has completely read the data in the instrumental accompaniment information file A (step S58). Since it is arranged that a music information table is formed in the RAM 43 as shown in FIG. 14 for storing the condition of installation completion flag, and the music information contained in the instrumental accompaniment information file with respect to each of the tray numbers, the read music information from the instrumental accompaniment information file A is stored in the music information table corresponding to the tray number N. When the instrumental accompaniment information file A has been completely read, it is determined from the data in the information file A whether or not there is any last file number m of the instrumental accompaniment information file of any other disk (step S59).

If there is no m number of the last file, the disk carrying the tray number N is the first disk in a pack. Therefore, the installation completion flag corresponding to the tray number N in the music information table is set at "1" (step S60), and then, 1 is subtracted from the tray number N to obtain a new tray number N (step S61). The process will proceed to step S72 which will be described later.

If the last file number is m, the tray number N is a disk other than the first disk in that pack. Therefore, the music information in the instrumental accompaniment information file A which is written corresponding to the tray number N in the music information table should be rewritten so that the music information corresponds to the tray number N–m (step S62). Then, an instruction is generated to the player section 34 in order to read the instrumental accompaniment information file Am (step S63). The system controller 37 writes the music information thus read from the instrumental accompaniment information file Am onto the music information table in the RAM 43 one after another corresponding to the tray number N (step S64), and then, determines whether or not the player section 34 has completely read the data in the instrumental accompaniment information file Am (step S65).

When the instrumental accompaniment information file Am has been read completely, the installation completion flag corresponding to the tray number N in the music information table is set at "1" (step S66), and 1 is subtracted from m (step S67). Also, 1 is subtracted from the tray number N (step S68). It is also determined whether or not there is any other instrumental accompaniment information file to be read (step S69). In this determination, unless the m which is newly obtained at the step S67 is equal to 0, there is another instrumental accompaniment information file to be read from the disk which has been set by the player section 34. Thus, the process will return to the step S63 where an instruction is generated to the player section 34 to read the instrumental accompaniment information file Am. However, if the m is equal to 0, there is no other instrumental accompaniment information file to be read from the disk which has been set on the player section 34. An instruction is generated to the player section 34 in order to stop its operation (step S70), and then, a disk return instruction is generated to the disk carrier section 33 (step S71). Consequently, the player section 34 stops driving the turntable to rotate. The disk carrier section 33 transports the disk from the turntable to its given accommodating position in the disk accommodating section 32 to place it.

After executing the step S71, the system controller 37 determines whether or not any disk is newly accommodated (step S72). In other words, at the step S72, it is determined whether or not the installation completion flag corresponding to the tray number N in the music information table is set at "1". If the installation completion flag is set at "0" corresponding to the tray number N, the process will proceed to step S53. If the installation completion flag corresponding to the tray number N is set at "1", the operation of installation is terminated because the music information for the disk carrying the tray number N has been written to the music information table completely. Therefore, if seven disks are accommodated in the trays number 1 to 7 in the disk accommodating section 32 of the autochanger 31, the installation completion flag is set at "1" for the tray numbers 1 to 7 as shown in FIG. 14 only when the information of the instrumental accompaniments is read from the disks retained in the tray numbers 7 and 5. Also, the contents of the instrumental accompaniment information files are stored in order of A, A1, A2, A3, A4, A, and A1 end corresponding to the tray numbers.

As described above, after the operation of installation, the karaoke reproduction is possible for the music selected by the user. The operation of music selection is the same as the operation shown in conjunction with FIG. 7. The music selection numbers are written onto the list table for selecting pieces of music formed in the RAM 43 according to the order in which pieces of music are selected.

Figure 15:
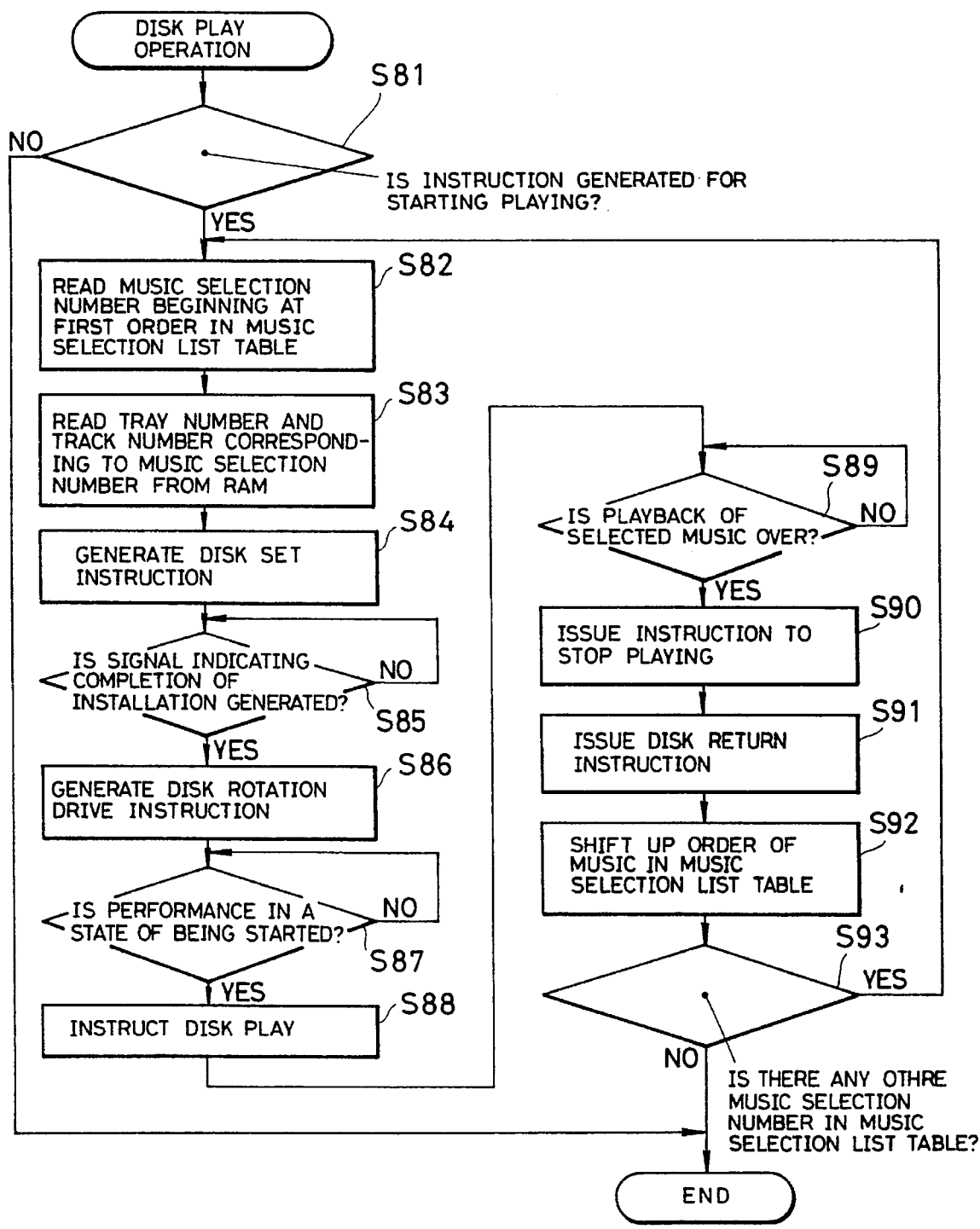
FIG. 15 is a flowchart showing the operation of disk play for the apparatus represented in FIG. 11.

Now, in the operation of playing disks, when an instruction is given through the operation of keys in the operation section 45 for starting the playback (step S81) as shown in FIG. 15, the system controller 37 reads at first the music selection number beginning at the first order of performance in the music selection list table formed in the RAM 43 (step S82), and reads from the music information table in the RAM 43 the tray number and track number corresponding to the music selection number thus read (step S83), and then, generates a disk set instruction to the disk carrier section 33 so that the disk carrying he read tray number is set on the turntable of the player section 34 (step S84). When the disk carrier section 33 has set the disk on the turntable of the player section 34, this event is provided for the system controller 37 as a signal indicating the completion of installation. Therefore, obtaining the installation completion signal (step S85), the system controller 37 instructs the player section 34 to drive the disk to rotate (step S86), thus determining whether or not it is possible to start playing the disk (step S87). If, for example, any playback performance is prohibited by the operation of keys in the operation section 45, the disk playback is not started. If it is allowed to start the disk playback, an instruction is generated to play the disk from the track carrying the track number which has been read (step S88). Consequently, the player section 34 starts playing the music designated by the music selection number. The reproduced image signal and audio signal are output from the display 52 and the speaker 49, respectively.

After executing the step S88, the system controller 37 determines whether or not the playback of the selected music has been over (step S89). This is determined by time information in the control data being supplied from the data separator 36 as the result of the disk playback. When the playback of the selected music is over, an instruction is generated to the player section 34 to stop the playback (step S90), and a disk return instruction is generated to the disk carrier section 33 (step S91). Consequently, the player section 34 stops the disk playback, and the disk carrier section 33 transports the disk from the turntable to a given accommodating position in the disk accommodating section 32 to place it after the rotation of the turntable is stopped. After generating the disk return instruction, the system controller 37 shifts the order of music number in the music selection list table by e portion equivalent to a piece of music (step S92), and determines whether or not there is any music selection number recorded on the first order of the music selection list table (step S93). If any music selection number is recorded, the process will return to the step S82 to repeat the above-mentioned operation. If, on the contrary, no music selection number is recorded, the playback operation is terminated.

In this respect, according to the above-mentioned embodiment, an example is shown in which one pack is constituted of five disks. It is possible to form one pack by a plurality of disks such as four or six, not necessarily limited to five disks. However, the number of such disks is related to the capacity of memory on which the instrumental accompaniment information files for instrumental accompaniments can be stored for each disk.

Also, according to the above-mentioned embodiment, the disks are accommodated in the disk accommodating section 32 of the autochanger 31 in the order of tray numbers. Therefore, it is assumed that there is no empty tray. However, it is required only to accommodate the disks in the order of tray numbers per pack. In other words, the condition of accommodation can be such that only the first and second disks are retained in the tray numbers one and two of the first pack which must be in a position representing the tray numbers 1 to 5, and only the first, second, and third disks are retained in the tray numbers 6, 7, and 8 in the second pack which must be in a position representing the tray numbers 6 to 10. In this case, it is required only to make an arrangement such that when an installation is executed, the three information files are read for instrumental accompaniments on the disk carrying the tray number 8, and then, the two information files are read for instrumental accompaniments on the disk carrying the tray number two by detecting the presence of the tray number two by means of a switch for detecting the presence or absence of each of the retained disks.

Further, according to each of the above-mentioned embodiments, the description has been made of the use of disks as recording media, but obviously, the media are not necessarily limited thereto. Tapes, cards and other recording media can also be used.

As described above, in the apparatus for playing a recording medium according to the present invention; a plurality of recording media are accommodated in an accommodating section together with a correlative position information recording medium which is recorded relation information related to the recorded contents of each of the plurality of recording media, and correlative position information indicating correlative positions of the plurality of recording media at the time of the accommodated condition, and then, the correlative position information and the relation information reproduced by playing means from the correlative position information recording medium are interrelatedly hold in a memory with respect to a plurality of recording media. Therefore, in operating the installation, it is only necessary to reproduce the recorded contents from the correlative position information recording medium. There is no need for reproducing the recorded contents of each of the recording media per recording medium as in conventional apparatuses, hence making it possible to significantly shorten the time required for the operation installation. Also, it is possible to accommodate recording media freely in comparison with the conventional apparatuses the because these media can be retained in any position of the accommodating section if only these are accommodated in the unit of a group of a plurality of recording media including at least one correlative position information recording medium.

What is claimed is:

1. An apparatus for playing a recording medium comprising:

an accommodating section for accommodating a plurality of recording media;

memory means for storing relation information related to the recorded contents of each of said plurality of recording media, and position information indicating the position of each of said plurality of recording media; and means for selectively playing a recording medium from said plurality of recording media in accordance with an instruction while referring to the stored contents of said memory means, wherein at least one of said plurality of recording media is a correlative position information recording medium for recording said relation information of each of said plurality of recording media, and correlative position information indicating correlative positions of each of said plurality of recording media at the time of being accommodated, and said memory means interrelatedly stores in memory said correlative position information and said relation information of said plurality of recording media reproduced by said playing means from said correlative position information recording medium.

2. The apparatus for playing a recording medium according to claim 1, wherein a plurality of a recording media including at least one correlative position information recording medium are continuously accommodated as at least one group in said accommodating section.

* * * * *